July 29, 1969    J. R. HARKNESS    3,457,804
COUNTERBALANCE FOR SINGLE-CYLINDER ENGINES
Filed Sept. 6, 1967    5 Sheets-Sheet 1

Inventor
Joseph R. Harkness
By [signature]
Attorney

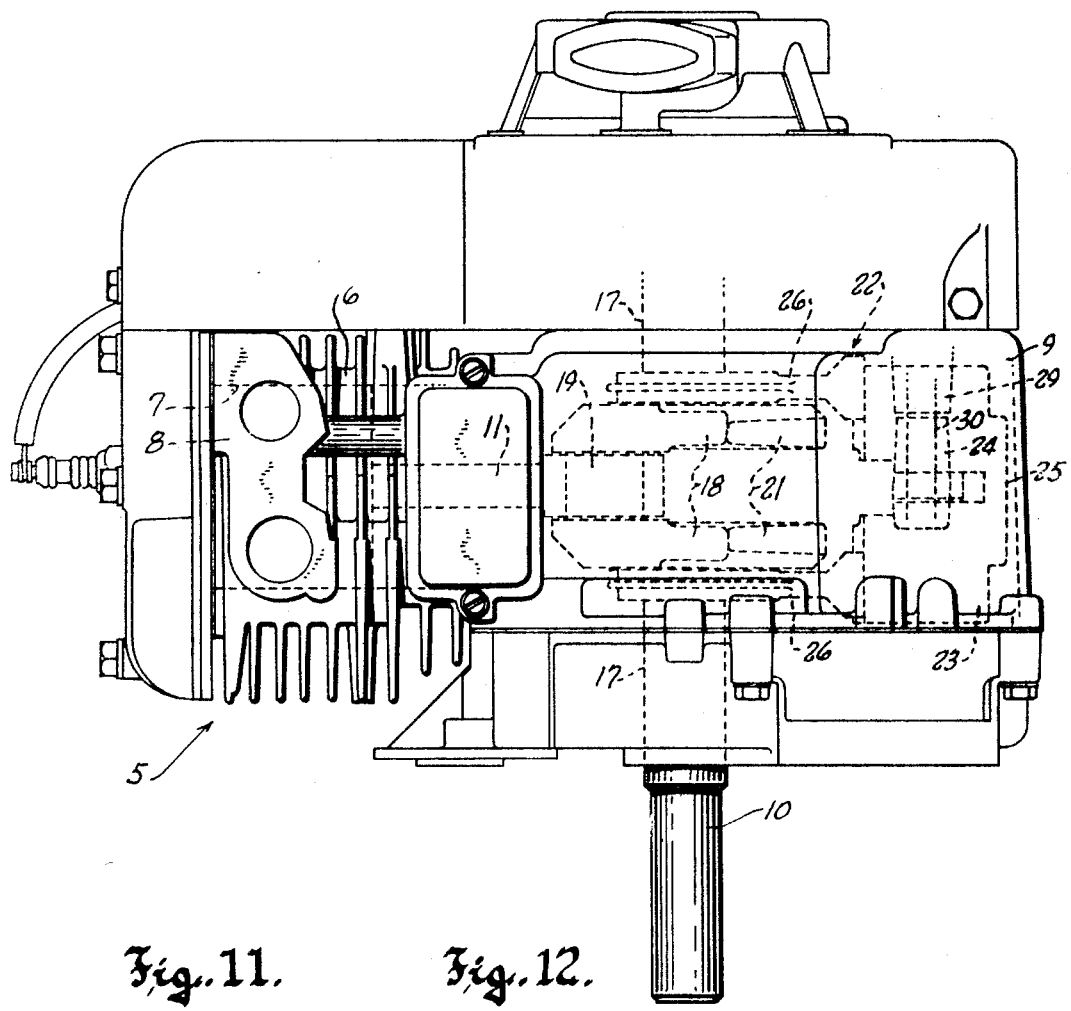
Fig. 2.
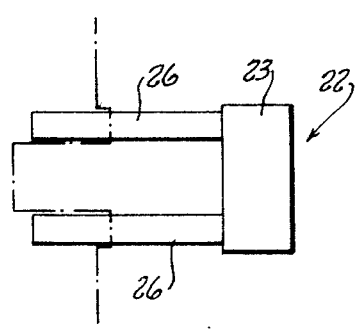 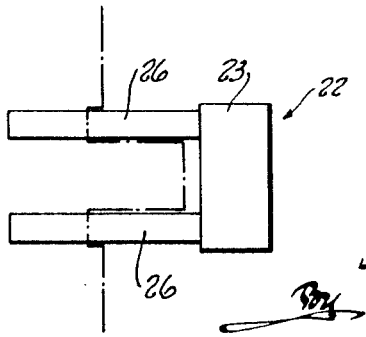
Fig. 11. Fig. 12.
Inventor
Joseph R. Harkness
Attorney

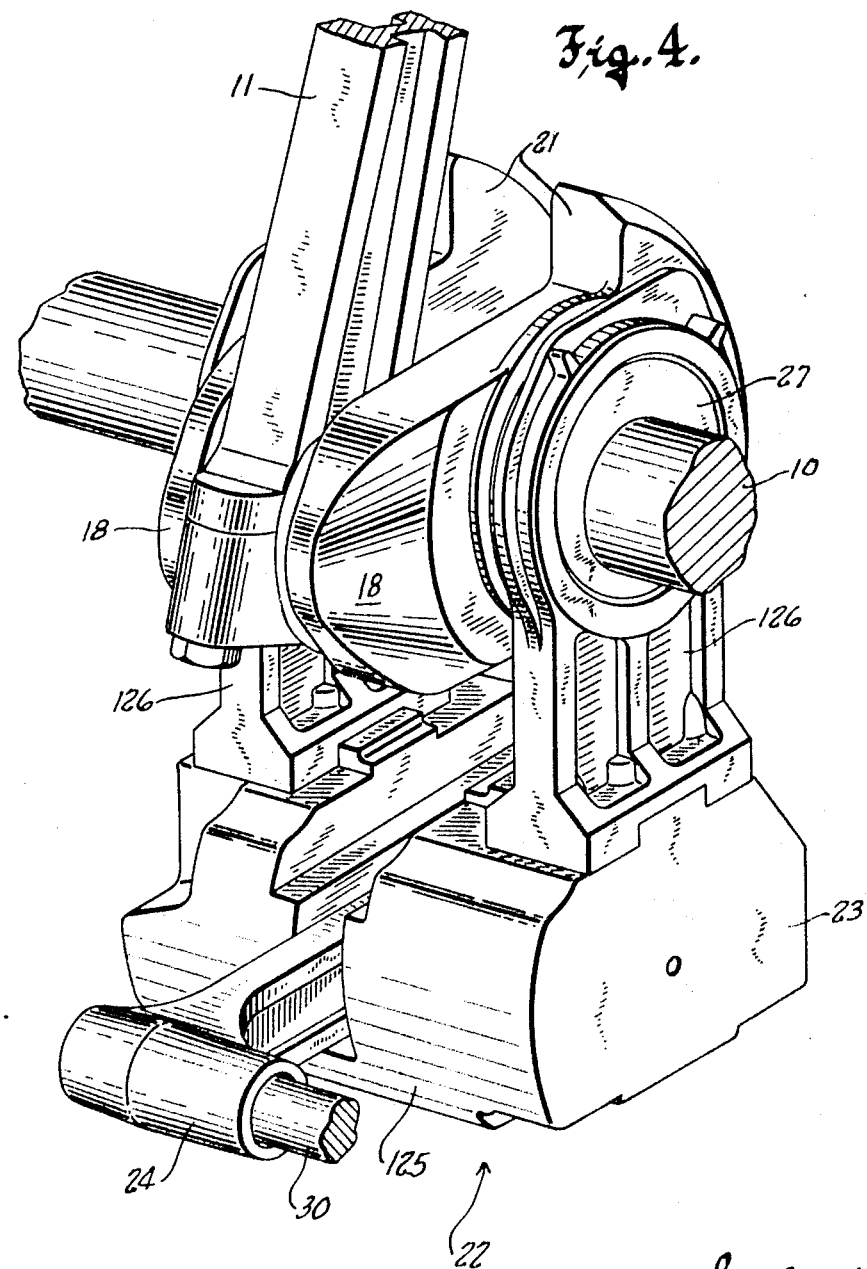

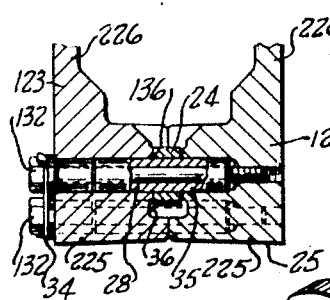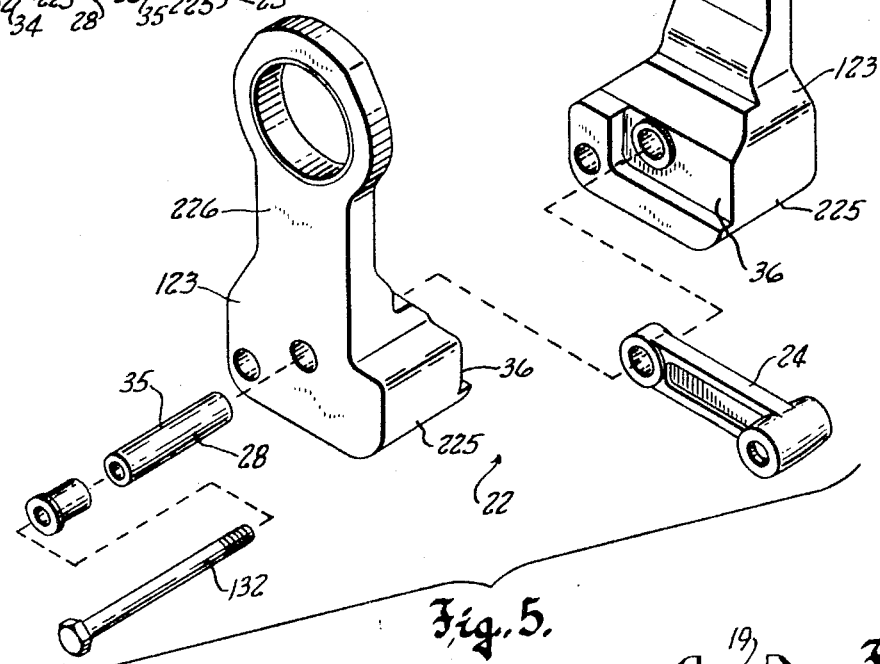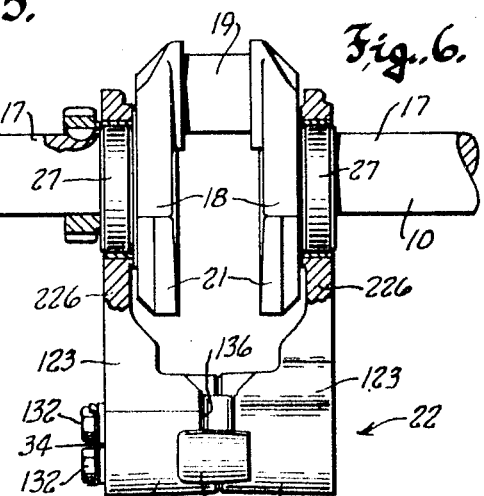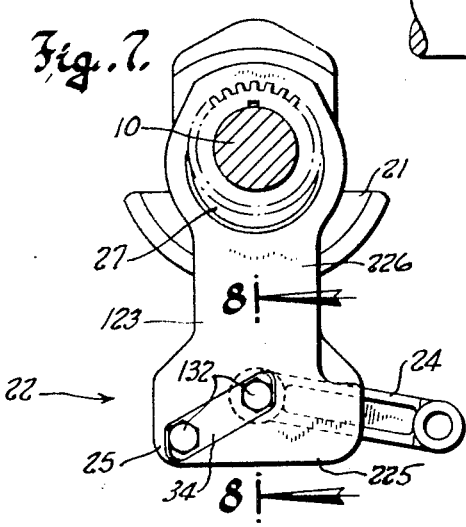

United States Patent Office 3,457,804
Patented July 29, 1969

3,457,804
COUNTERBALANCE FOR SINGLE-CYLINDER ENGINES
Joseph R. Harkness, Germantown, Wis., assignor to Briggs & Stratton Corporation, Wauwatosa, Wis., a corporation of Delaware
Filed Sept. 6, 1967, Ser. No. 665,854
Int. Cl. F16f 15/26
U.S. Cl. 74—604        3 Claims

ABSTRACT OF THE DISCLOSURE

Piston acceleration and deceleration forces are substantially cancelled by a U-shaped counterbalance having its bight portion at the side of the crankshaft opposite the cylinder. The arms of the counterbalance are journaled on eccentrics on the crankshaft axially outwardly of the crankpin and offset to the side of the crankshaft axis opposite the crankpin but at a lesser distance from said axis than the crankpin. A link having pivotal connections with the crankcase wall and the counterbalance bight portion confines the counterbalance to motion nearly along the cylinder axis.

---

This invention relates to single-cylinder engines such as are widely used for powering lawn mowers, sump pumps, portable generators and the like, and is more particularly related to a single-cylinder engine having means for offsetting the unbalanced dynamic forces produced during normal operation of the engine in order to reduce vibration of the engine to a very low level.

The single-cylinder engines with which this invention is concerned have long presented an annoying problem that was most acute when such engines were used on tractors, mowing machines, scooters and the like, operated by a person riding on the machine. In such installations the engine produced a vibration that was transmitted through the machine to the operator, being manifested at the seat, the foot rests and the steering means. While not intolerable for relatively short periods of operation, such vibration was always uncomfortable and could produce severe driver fatigue in cases of continuous operation over an extended period of time.

Even in an installation where there can be no element of operator fatigue, engine vibration is usually undesirable because it causes maintenance problems and tends to reduce the useful life of the machine.

The basic cause of vibration in a single-cylinder engine is piston reciprocation. The piston is started and stopped twice during each rotation of the crankshaft, and reactions to the forces accelerating and decelerating the piston are imposed upon the engine body as vibration in directions parallel to the cylinder axis.

To some extent such vibrations can be decreased by providing the engine with a counterweight fixed on its crankshaft, located at the side of the crankshaft axis opposite the crankpin by which the connecting rod is connected to the crankshaft. Such a counterweight produces a net resultant centrifugal force vector that is diametrically opposite to the crankpin. The centrifugal force vector of the counterweight has a component parallel to the cylinder axis that varies as the crankshaft rotates and acts in opposition to the acceleration and deceleration forces on the assemblage comprising the piston, its wrist pin and the connecting rod.

If the mass of the counterweight is great enough, this component can cancel the acceleration and deceleration forces on the piston assemblage. Such a force cancelling condition exists when the counterweight is of such mass and radius of gyration that its centrifugal force more than cancels the centrifugal forces due to the rotating masses of the crankpin and the big end of the connecting rod and is big enough so that it also offsets the acceleration and deceleration forces of the piston. Such counterweighting can be designated a condition of 100% overbalance.

Unfortunately the centrifugal force due to the counterweight also has a component transverse to the cylinder axis by which vibration is produced. As the mass of the counterweight is increased, the vibration transverse to the cylinder axis also increases, becoming excessive for practical purposes when the condition of 100% overbalance is approached. For this reason most single cylinder engines incorporate crankshaft counterweights having a mass that provides a condition of about 50% overbalance, so that the centrifugal force due to the counterweight has a component along the cylinder axis that is equal to about 50% of the acceleration forces on the piston assemblage. This represents a compromise between the severe vibration in directions parallel to the cylinder axis that would obtain with a condition of no overbalance and the severe vibration transverse to the cylinder axis that would obtain with a condition of 100% overbalance. With the compromise condition of about 50% overbalance there is of course some vibration parallel to the cylinder axis and some vibration transverse to it. As compared to a crankshaft that is not overbalanced, the condition of about 50% overbalance affords a decrease in the forces producing vibration parallel to the cylinder axis which is about equal to the increase in forces at right angles to that axis.

Unsatisfactory as it is, the use of a counterweight that provides a condition of about 50% overbalance is the nearest that commercially available engines have come to vibration-free operation.

Several schemes have been proposed for further reducing vibration producing forces in a single-cylinder engine, but all of them have been impractical for one reason or another and therefore none of them has ever come into widespread use. Examples of such previously disclosed expedients can be found in the following United States patents: Barth et al., No. 3,203,274; Berlyn, No. 3,112,658; and Ljungstrom, No. 2,235,160.

In order to be feasible, any expedient for reducing vibration in the single-cylinder engines with which this invention is concerned must be simple and inexpensive, and, in particular, must not require that difficult tolerances be held during manufacture of the engine; must be automatically lubricated if it has moving parts, without interfering with normal engine lubrication; and must obviously be reliable and trouble free. It is also highly desirable that any such vibration reducing expedient be adaptable to incorporation in previously existing engine designs without requiring major modifications thereof.

The general object of this invention is to provide a means for so counterbalancing the piston-crankshaft assemblage of a single cylinder engine as to reduce to a negligible amount vibration in direction parallel to the cylinder axis, without producing any substantial vibration component in directions perpendicular to the cylinder axis, and which counterbalancing means comports to a very satisfactory extent with all of the desiderata just mentioned.

Another object of this invention is to provide counterbalancing means of the character just described that can be incorporated in both horizontal crankshaft engines and vertical crankshaft engines.

A further and more specific but very important object of this invention is to provide a counterbalancing means of the character described which is mainly confined to motion in directions substantially parallel to the cylinder axis, and which therefore has negligible tendency to produce vibration forces in directions perpendicular to that axis, but wherein all connections between moving parts are pivotal connections that are easily lubricated and relatively trouble free, with no slidably guided elements in the counterbalance that would require the maintenance of difficult manufacturing tolerances and could, in operation, bind, wear unevenly, be noisy, or otherwise cause trouble.

Another specific but very important object of this invention is to provide a counterbalance for a single-cylinder engine having its moving masses arranged symmetrically with respect to the cylinder axis so that the inertia forces of the counterbalance produce no couple that would cause vibration.

Those skilled in the art will recognize that it is also an object of this invention to provide improved counterbalancing means for machines other than internal combustion engines and which are of the general type that comprises a single cylinder in which a piston is reciprocable, a crankshaft rotatable in a crankcase, and a connecting rod connecting the piston with the crankshaft, one typical machine of this class being a reciprocating compressor pump.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiment of the invention constructed according to the best modes so far devised for the practical application of the principles thereof, and in which:

FIGURE 2 is a view generally similar to FIGURE 1 but illustrating the invention incorporated in a horizontal cylinder engine;

FIGURE 4 is a fragmentary perspective view on a still larger scale illustrating the counterbalance in its relation to its adjacent portions of the crankshaft and connecting rod;

FIGURE 5 is a disassembled perspective view of a modified embodiment of the counterbalance of this invention;

FIGURE 6 is a view in front elevation of the counterbalance shown in FIGURE 5;

FIGURE 7 is a view in side elevation of the counterbalance shown in FIGURES 5 and 6.

FIGURE 8 is a fragmentary sectional view taken on the plane of the line 8—8 in FIGURE 7; and FIGURES 9 through 12 are diagrammatic views showing the relative positions of the counterbalance at the limits of piston motion.

Figure 1:
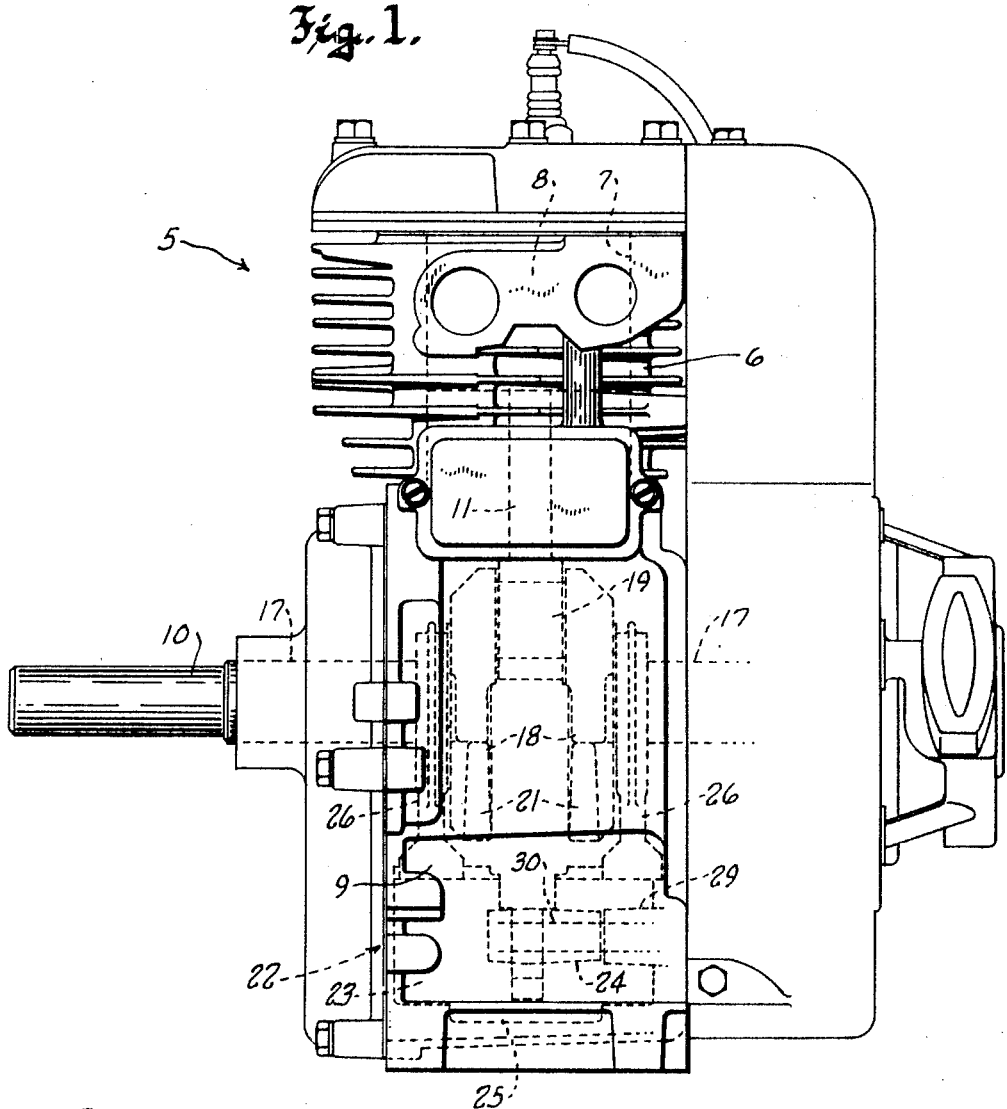
FIGURE 1 is a view in side elevation of a vertical cylinder engine incorporating the counterbalance of this invention.
Figure 9:
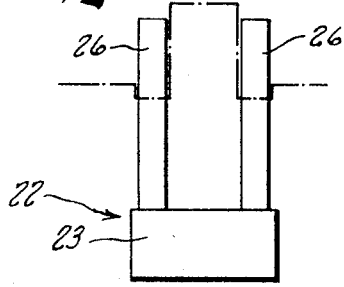
Figure 10:
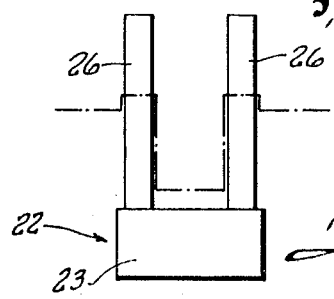

Referring now to the accompanying drawings, the numeral 5 designates generally a single-cylinder engine having a body 6 that defines a cylinder 7 in which a piston 8 is reciprocable and a crankcase 9 in which a crankshaft 10 is rotatable. The piston 8 is of course connected with the crankshaft 10 by means of a connecting rod 11.

For purposes of illustration the engine is here shown as being of the four-cycle types, with valves (not shown) that are actuated in timed relation to piston reciprocation by means of a camshaft 13 having cams 14 thereon and which is driven from the crankshaft 10 by means of meshing timing gears 15 and 16 that are respectively fixed on the crankshaft and camshaft. It will be understood, however, that the invention is equally applicable to two-cycle engines.

The crankshaft 10 of the engine has coaxial journal portions 17 that are rotatably received in opposite end walls of the crankcase. The crankshaft also comprises a pair of crank arms 18, each extending transversely to the axially inner end of a journal portion 17, and the two arms 18 are connected by a crankpin 19 that is offset with respect to the crankshaft axis and parallel thereto. One end of the connecting rod 11 is journaled on the crankpin 19, and its other end is connected to the piston by means of a wrist pin 20.

The crank arms 18 extend diametrically across the crankshaft axis to the side thereof opposite the crankpin, where each is formed with an enlargement or mass that provides a counterweight 21. The two counterweights are of course equal in mass and moment, and they are likewise symmetrically disposed with respect to the cylinder axis. The mass and moment of these counterweights is such that they counterbalance the crankpin and the big end of the connecting rod, but do not substantially overbalance that rotating assemblage. Dynamic balance that offsets the acceleration and deceleration forces of the piston is mainly provided by the counterbalance means 22 now to be described.

The counterbalance means comprises, in general, a U-shaped element 23 and a link 24 that is connected between the bight portion 25 of the U-shaped counterbalance element and a wall of the crankcase.

The arms 26 of the U-shaped element are journaled on eccentric journal portions 27 on the crankshaft that are axially outwardly adjacent to the crank arms and have their coinciding axes spaced to the opposite side of the crankshaft axis from the crankpin. The axis of these eccentric journal portions is at a smaller distance from the crankshaft axis than the crank pin 19, so that as the crankshaft rotates the upper ends of the arms 26 of the counterbalance element describe an orbit substantially smaller than that of the big end of the connecting rod.

The link 24 confines the counterbalance element to an orientation with its bight portion 25 at the side of the crankshaft axis opposite the cylinder, and also constrains the bight portion to motion substantially parallel to the cylinder axis. At one end the link is pivotally connected with a pin 28 that bridges the arms of the counterbalance near its bight portion. A boss 29 on an end wall of the crankcase supports a pin 30 on which the other end of the link is pivoted. Note that provision of the boss 29 is the only modification that need be made in the body of a heretofore conventional engine in order to adapt it for incorporation of the counterbalance means of this invention.

The link is so arranged that its longitudinal centerline intersects the cylinder axis so that the moving mass of the link is symmetrical to that axis.

It will be observed that the pins 28 and 30 to which the link is connected have their axes parallel to that of the crankshaft and in a plane substantially normal to the cylinder axis. Although the link pin 28 on the counterbalance swings in an arc about the axis of the fixed link pin 30, the effective length of the link is several times the throw of the eccentric journal portions 27 of the crankshaft by which the counterbalance is actuated, and therefore the arcuate motion of the bight portion 15 of the counterbalance has only a very small component transverse to the cylinder axis.

The end portions of the counterbalance arms that are carried on the eccentric journal portions 27 move orbitally, and must therefore be considered as part of a system that also includes the rotating counterweights 21 on the crankshaft for counterbalancing the rotating mass system that comprises the crankpin and the big end of the connecting rod. However, the moment arm of the arms 26 of the counterbalance is small because of their small orbit, and furthermore their mass is small as compared with that of the bight portion of the counterbalance. Hence the counterbalance is effective to produce inertia forces which are almost exclusively parallel to the cylinder axis and which are 180° out of phase with piston motion. Consequently the inertia forces of the counterbalance are effective to cancel piston acceleration and deceleration forces without producing any appreciable vibration transverse to the cylinder axis.

It will also be observed that the counterbalance means 22 is symmetrical about a plane which is on the cylinder axis and normal to the axis of the crankshaft, and therefore the inertia forces of the counterbalance are substantially balanced about the cylinder axis so that they produce no vibration-causing couple.

Figure 3:
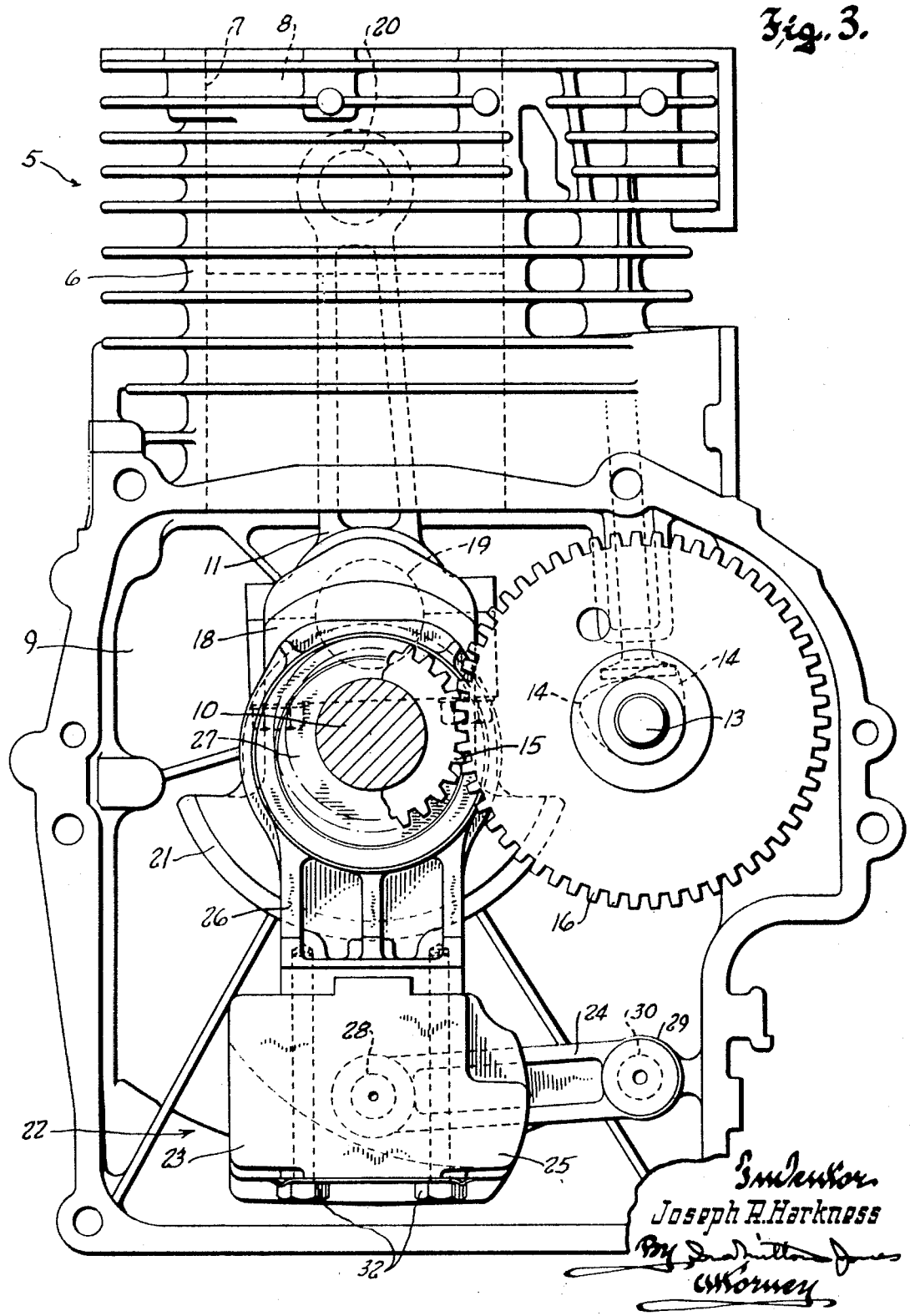
FIGURE 3 is a view on a larger scale of the engine illustrated in FIGURE 1, partly in side elevation but with the side wall of its crankcase broken away to show the counterbalance of this invention in its relation to other moving engine parts.

The counterbalance of that embodiment of the invention illustrated in FIGURES 1 through 4 is formed in three parts, namely a pair of arm members 126 and a separate bight member 125 which is secured to the arm members by means of bolts 32 extending upwardly through the bight member and into threaded holes in the arm members. This three-piece construction facilitates assembly of engines of certain types, but, other things being equal, a two piece counterbalance such as is illustrated in FIGURES 5-8 is preferred for reasons of economy and simplicity.

The modified form of counterbalance shown in FIGURES 5-8 comprises two generally L-shaped members 123, each having an upwardly projecting stem portion 226 that comprises one arm 26 of the assembled counterbalance and a laterally projecting base portion 225 that cooperates with the base portion on the other member to define the bight portion 25 of the counterbalance. The two members 123 are held in assembled relation by means of parallel bolts 132 which extend through holes in their base portions that are parallel to the crankshaft axis, the bolt holes in one of the members being threaded. A readily deformable metal strip 34 through which both bolts pass has its end portions bent against the noncircular heads on the bolts to safety them against rotation. A bushing 35 on one of the bolts 132 comprises the pin 28 to which the link 24 is connected. A recess 36 in the base portion of each counterbalance member defines a groove 136 in the assembled counterbalance across which the pin 28 extends and in which the swinging end of the link 24 is received.

Because the link swings through only a small arc, and the forces on the link pins 28 and 30 are small, those pins are subjected to little wear. Moreover they are assured of adequate lubrication by reason of their being at least partly within the reservoir of oil in the engine crankcase under normal operating conditions.

From the foregoing description taken with the accompanying drawings it will be apparent that this invention provides a counterbalance for a single cylinder engine that is simple, inexpensive and dependable, which substantially cancels the acceleration and deceleration reaction forces of the piston without producing significant vibrations transverse to the cylinder axis, and which is compact enough so that it can be accommodated within the crankcase of a heretofore conventional engine body without requiring any but a very minor modification thereof.

I claim:

1. In a machine of the type having a body that defines a cylinder and a crankcase, a crankshaft mounted in the crankcase and having a crankpin flanked by a pair of crank arms that connect the crankpin with the rest of the crankshaft in eccentrically offset relation to the crankshaft axis, and a piston axially reciprocable in the cylinder and connected with the crankpin, counterbalancing means for the moving parts of the machine comprising:
 (a) a pair of journals on the crankshaft, each axially outwardly adjacent to one of the crankarms, said journals having their axes coinciding and spaced to the side of the crankshaft axis opposite the crankpin;
 (b) a substantially U-shaped counterbalance having:
  (1) a pair of arms, each having an end portion journaled on one of said journals, and
  (2) a bight portion bridging said arms at the ends thereof remote from the journals, said bight portion having a transverse groove;
 (c) a link having one end portion guidingly received in said groove;
 (d) means connecting said end portion of the link and the bight portion of the counterbalance and providing for relative pivoting between them about an axis parallel to that of the crankshaft; and
 (e) means on the crankcase pivotally connecting the link thereto at its other end and disposing the link generally transverse to the axes of the cylinder and crankshaft.

2. The counterbalancing means of claim 1, further characterized by:
 (a) the bight portion of said U-shaped counterbalance comprising a member separate from the arms; and
 (b) bolts extending through said bight portion member and into threaded lengthwise extending holes in said arms to secure the bight portion member rigidly to the arms.

3. In a machine of the type having a body that defines a cylinder and a crankcase, a crankshaft mounted in the crankcase and having a crankpin flanked by a pair of crank arms that connect the crankpin with the rest of the crankshaft in eccentrically offset relation to the crankshaft axis, and a piston axially reciprocable in the cylinder and connected with the crankpin, counterbalancing means for the moving parts of the machine comprising:
 (a) a pair of journals on the crankshaft, each axially outwardly adjacent to one of the crank arms, said journals being coaxial with one another but having their axes spaced to the side of the crankshaft axis opposite the crankpin;
 (b) a pair of L-shaped counterbalance members, each having:
  (1) an arm that is journaled near one end thereof on one of said journals and extends in the direction generally away from the piston, and
  (2) each having a mass portion at the other end of said arm that extends in the direction of the crankshaft axis toward the other member,
  (3) the mass portion of each of said members having a recess therein that opens toward the other and cooperates with the recess in the other to define a groove;
 (c) means rigidly connecting the mass portions of the counterbalance members, the last mentioned means comprising a bolt which extends through one of said members and across said groove and which is threadedly received in the other counterbalance member;
 (d) a tubular bushing on said bolt, extending across said groove;
 (e) a link having one end portion journaled on said bushing and guidingly received in said groove; and
 (f) pivot means fixed on the crankcase and to which the other end portion of the link is swingably connected, said pivot means being located to dispose the link generally transverse to the axes of the cylinder and of the crankshaft.

References Cited

UNITED STATES PATENTS

| | | | |
|---|---|---|---|
| 617,987 | 1/1899 | Winton | 74—604 |
| 1,310,090 | 7/1919 | Ricardo | 74—604 |
| 1,342,648 | 6/1920 | Ricardo | 74—604 |
| 1,794,715 | 3/1931 | Knight | 74—604 |
| 2,227,942 | 1/1941 | Martin | 74—604 |

WENDELL E. BURNS, Primary Examiner

U.S. Cl. X.R.

123—192